US008221856B2

(12) United States Patent
Stroppiana

(10) Patent No.: US 8,221,856 B2
(45) Date of Patent: *Jul. 17, 2012

(54) SYNTHETIC GRASS STRUCTURE

(75) Inventor: Fernando Stroppiana, Grinzane Cavour (IT)

(73) Assignee: Mondo S.p.A., Alba Frazione Gallo (Cuneo) (IT)

(*) Notice: Subject to any disclaimer, the term of this patent is extended or adjusted under 35 U.S.C. 154(b) by 766 days.

This patent is subject to a terminal disclaimer.

(21) Appl. No.: 11/439,005

(22) Filed: May 23, 2006

(65) Prior Publication Data

US 2006/0269703 A1 Nov. 30, 2006

(30) Foreign Application Priority Data

May 27, 2005 (EP) ..................................... 05425378

(51) Int. Cl.
*A01N 3/00* (2006.01)
*A41G 1/00* (2006.01)
(52) U.S. Cl. ........................ 428/17; 52/403.1; 52/742.1
(58) Field of Classification Search .................. 52/403.1, 52/177, 180; 472/92, 94; 47/1.01 F, 1.01 R, 47/56, 65.9, 58.1 R, 23, 58.1 SC; 428/15, 428/17, 87, 92, 95
See application file for complete search history.

(56) References Cited

U.S. PATENT DOCUMENTS

| | | | | |
|---|---|---|---|---|
| 3,293,671 A * | 12/1966 | Griffin | ............................ | 5/655.9 |
| 3,499,848 A * | 3/1970 | Weisman | ....................... | 521/172 |
| 3,661,687 A * | 5/1972 | Spinney et al. | .................. | 428/17 |
| 3,801,421 A * | 4/1974 | Allen et al. | ....................... | 428/17 |
| 3,813,279 A * | 5/1974 | Varner, Jr. | ...................... | 428/178 |
| 3,900,656 A * | 8/1975 | Schmidt | .......................... | 428/215 |
| 4,878,974 A * | 11/1989 | Kagawa | ............................ | 156/85 |
| 5,158,821 A | 10/1992 | Gebauer et al. | ............... | 428/174 |
| 5,360,653 A * | 11/1994 | Ackley | ............................. | 428/71 |
| 6,221,445 B1 * | 4/2001 | Jones | .................................. | 428/17 |
| 6,616,542 B1 * | 9/2003 | Reddick | ......................... | 473/171 |
| 6,877,535 B1 | 4/2005 | Bennington | .................. | 144/235 |

(Continued)

FOREIGN PATENT DOCUMENTS

DE 38 35 880 A1 4/1990

(Continued)

OTHER PUBLICATIONS

European Search Report for Application No. EP 05 42 5378, dated Oct. 28, 2005, 3 pages.

*Primary Examiner* — William Gilbert
*Assistant Examiner* — Theodore Adamos
(74) *Attorney, Agent, or Firm* — Heslin Rothenberg Farley & Mesiti P.C.; Victor A. Cardona

(57) ABSTRACT

An elastic underlayer for floorings, for instance, floorings for sports facilities such as synthetic-grass coverings, comprises a first laminar structure and a second laminar structure that enclose between them pouches filled with granular elastic material. The structures in question comprise a layer of non-woven fabric coupled with a polyolefin layer. The polyolefin layers enclose between them the pouches, which preferably have a parallelepiped shape with a square base, with sides having a length of 20-60 mm, typically 45 mm, and a height of between 20 and 40 mm, typically 30 mm. The pouches are filled with granular elastic material, such as granules of recycled tires having a size of between 0.5 and 7.0 mm.

30 Claims, 3 Drawing Sheets

U.S. PATENT DOCUMENTS

| | | | | |
|---|---|---|---|---|
| 7,083,147 B2 * | 8/2006 | Movsesian et al. | | 244/121 |
| 2002/0039929 A1 * | 4/2002 | Morris | | 473/157 |
| 2003/0044549 A1 * | 3/2003 | Walters | | 428/17 |
| 2004/0163345 A1 * | 8/2004 | Alderman | | 52/404.1 |
| 2006/0084513 A1 * | 4/2006 | De Vries et al. | | 472/92 |
| 2006/0130363 A1 * | 6/2006 | Hottinger | | 36/28 |
| 2006/0172637 A1 * | 8/2006 | Hosokawa et al. | | 442/1 |

FOREIGN PATENT DOCUMENTS

| | | |
|---|---|---|
| DE | 195 35 275 A1 | 3/1997 |
| EP | 1 319 753 A2 | 6/2003 |
| EP | 1 375 750 A1 | 1/2004 |
| EP | 1 486 613 A1 | 12/2004 |
| EP | 1 158 099 B1 | 4/2006 |
| EP | 1 371 779 B1 | 4/2006 |

* cited by examiner

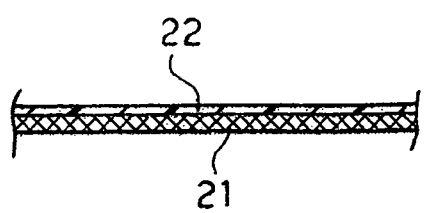
Fig._4
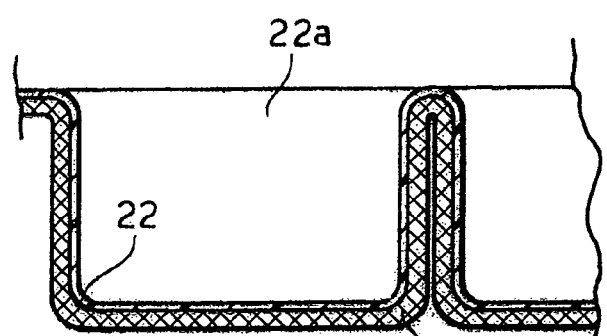
Fig._5
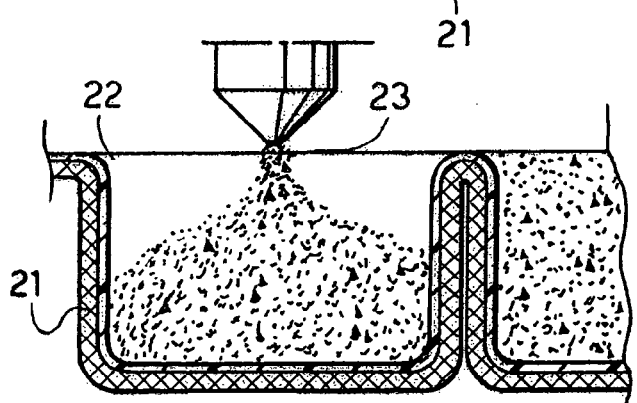
Fig._6
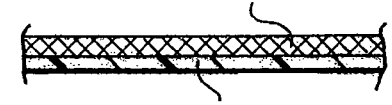
Fig._7
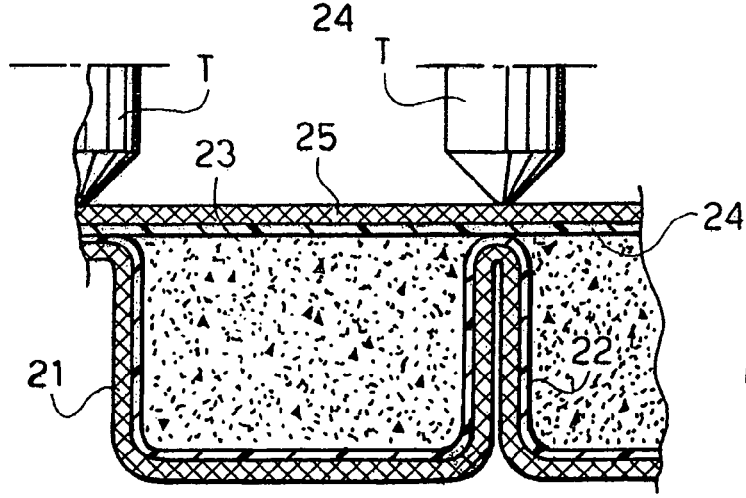
Fig._8

SYNTHETIC GRASS STRUCTURE

CROSS-REFERENCE TO RELATED APPLICATIONS

This application claims priority from European Patent Application No. 05425378.6, filed May 27, 2005, the entire disclosure of which is incorporated herein by reference.

The present invention relates to elastic underlayers for floorings.

The invention has been developed with particular attention paid to its possible use in conjunction with floorings for sports facilities, but can in actual fact be used not only for providing a controlled elastic underlayer, suitable for all sports activities, but also for the rehabilitation of persons who have suffered traumas and/or undergone surgical operations, as well as for use in areas of safety in playgrounds for small children.

In particular, the invention is suitable for being used in conjunction with synthetic-grass coverings of the type described in the U.S. Pat. No. 6,877,535 (to which EP-A-1 158 099 corresponds). These are substantially synthetic-grass coverings, which comprise a laminar base in the form of a sheet with a plurality of filiform formations extending from the substrate to simulate the grassy sward of natural turf and a particulate filling material or infill dispersed between the filiform formations so as to maintain the filiform formations themselves in a substantially upright condition. The particulate filling material is formed by a substantially homogeneous mass of a granular material chosen in the group made up of polyolefin-based materials and vinyl-polymer-based materials.

Further advantageous developments of this solution are described in the documents Nos. EP-A-1 319 753, EP-A-1 375 750, and EP-A-1 371 779, as well as in the European patent application No. 03425369, all these documents being assigned to the applicant of the present patent application.

Also directing our attention away from the specific field of synthetic-grass coverings, it may be stated that less attention has on the whole been paid to the general conditions of laying of floorings, whether floorings designed for sporting activities or otherwise. With the exception of treatments designed to render the laying surface sufficiently flat and (in the case of floorings designed to be laid outdoors) such as to enable a good drainage of rain water (for example owing to a general crowned conformation), it has in fact generally been assumed that the floorings should usually be laid on a floor foundation such as a base course made of cement or on tamped earth. This problem is, on the other hand, shared also by other types of flooring, for instance by floorings for sports facilities designed to be used in conditions of temporary laying on a pre-existing flooring or even on a roadbed, where the characteristics of the subgrade are not uniform and/or are largely unforeseeable. Similar considerations also apply to other types of floorings for industrial, commercial and residential purposes.

The object of present invention is to provide a solution that will be able to overcome the drawbacks outlined above, enabling laying of floorings of any kind (for instance, floorings for sports facilities, such as synthetic-grass coverings) in conditions that will be altogether satisfactory and that can be determined with a high degree of certainty beforehand.

According to the present invention, the above object is achieved thanks to an underlayer having the characteristics referred to specifically in the ensuing claims. The invention also relates to the corresponding manufacturing process.

The claims form an integral part of the disclosure provided herein in relation to the invention.

The invention is suitable for producing and using an elastic underlayer (technically defined as "shock pad"), designed to provide the characteristics desired for structures for sports facilities in general and, in particular, for structures with synthetic-grass cover.

The corresponding product in the form of a mattress, of variable shape, both as regards its thickness and as regards its structure and design. Each variable produces a system capable of responding to specific requirements, whether sports requirements or civil requirements and/or physiotherapeutic and rehabilitation requirements.

In the case of football pitches, the solution described herein can be used to replace the foundations made of cement and asphalt. In the case of gymnasia for basketball and volleyball, and multi-purpose gymnasia, it is studied so as to eliminate the rigidity of cement foundations and bestow on the sports flooring those characteristics of shock absorption and adequate elastic yield necessary for prolonged training and for competitions at all levels, eliminating any risk of injury that an athlete may undergo during training on surfaces that are unsuitable (in the sporting field, there exist very clear standards in this connection).

The solution described herein can also be employed in the context of fitness and rehabilitation activities, it being perfectly suitable for post-operative rehabilitation activities, thanks to the capacity of cushion any impact when the limb comes into contact with the floor, without causing return of energy, as could be the effect of a rigid surface.

Again, the solution described herein is suitable for meeting the requirements of safety areas, equipped as playing areas for small children, in parks, in public premises such as schools and nurseries, for cushioning falls and preventing traumas for all those who use these structures.

The solution described herein is likewise suited for use in working areas where workers have to spend a long time standing up (cash-desks—reception desks—ticket offices) so that they will not suffer from fatigue due to the rigid surfaces.

Consequently, the corresponding system can be developed so as to obtain different products, suitable for responding to the different requirements both of a sports nature and of a safety and rehabilitation nature.

The invention will now be described, purely by way of non-limiting example, with reference to the annexed sheets of drawings, in which:

FIGS. 4 to 8 illustrate successive steps of manufacturing of the aforesaid underlayer.

Figure 1:
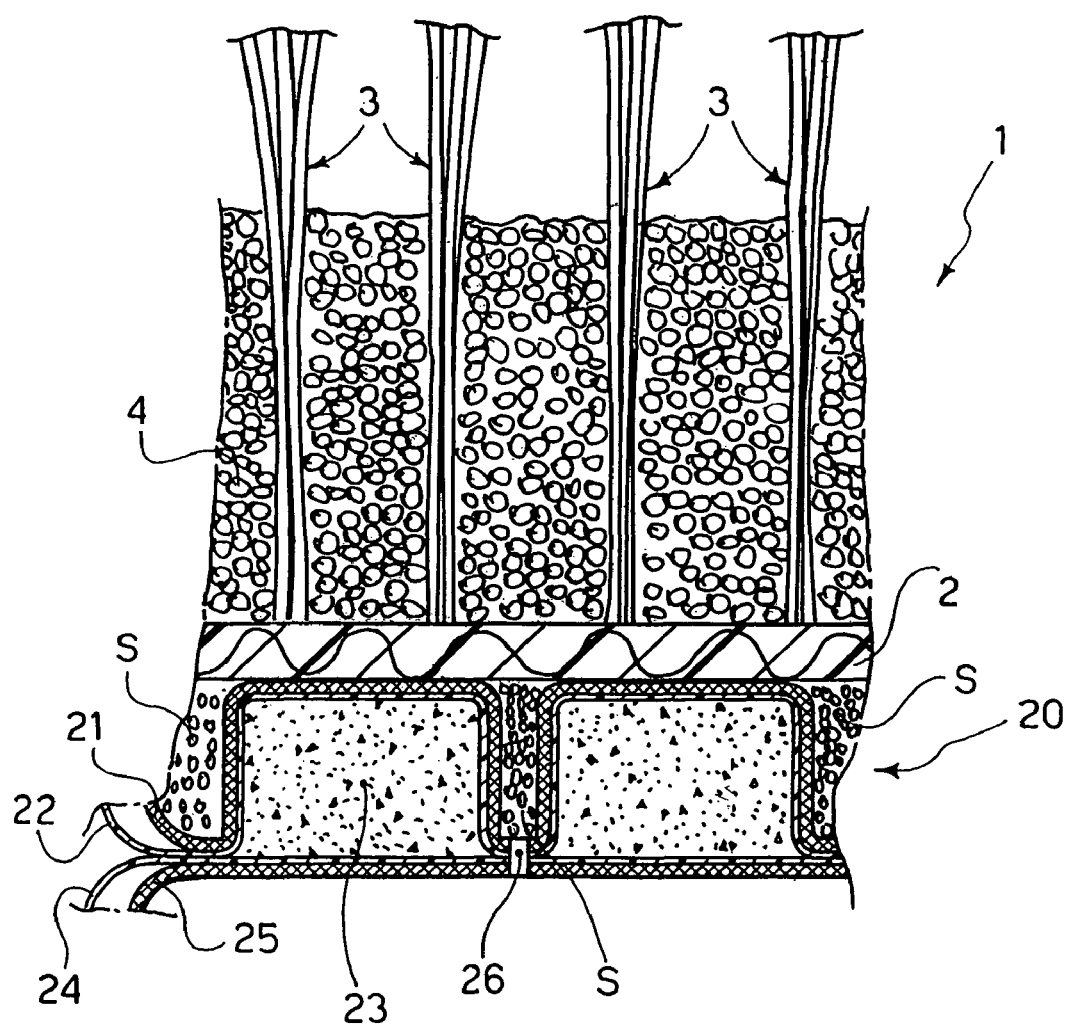
FIG. 1 is a general cross-sectional view of the structure of a flooring for sports facilities, such as a synthetic-grass cover, provided with an underlayer of the type described herein.

In FIG. 1, the reference number 1 designates, as a whole, a flooring, exemplified herein by a flooring for sports activities constituted by a structure of synthetic-grass cover basically comprising two parts or elements:

a base part 2; and a plurality of filiform formations 3 extending from the base 2 for simulating the grassy sward of natural turf.

In any case, it is emphasized once again that the present invention is not tied down to its use with a specific type of flooring. The solution according to the invention, in fact, enables floorings—of any type—to be laid in conditions that will be altogether satisfactory and that can be determined with a high degree of certainty beforehand.

The structure of synthetic-grass cover 1 represented in FIG. 1 can possibly be completed with a particulate filling material (also referred to as "infill material" or "infill") 4 set between the filiform formations 3 so as to keep them in a substantially upright condition. Advantageously, said filling material can be formed by a substantially homogeneous mass of a granular material chosen in the group made up of polyolefin-based materials and vinyl-polymer-based materials.

The solution described herein is, however, irrespective of whether the synthetic-grass cover in question is designed or otherwise to be completed with infill material.

In the normal laying condition of the synthetic-grass cover 1, the base 2 is designed to rest on an elastic underlayer 20, the characteristics of which will be illustrated more fully in what follows.

In the schematic representation of FIG. 1, it is indicated that the filiform formations 3 can present, at their distal or top ends, a velvety or plush appearance, i.e., a free-pile appearance. The solution described herein can, however, also be applied to a synthetic-grass cover in which the filiform formations 3 have a general curled or looped conformation, designed to bestow upon the structure 1 an appearance that as a whole approximates that of a fabric or a moquette of the type commonly referred to as "bouclé".

Basically, the underlayer 20 is designed to perform the function of what is commonly referred to as "shock pad", i.e., an elastic underlayer that bestows the desired biomechanical characteristics upon structures used for sports activities in general and in particular upon synthetic-grass coverings.

In the examplary of embodiment illustrated herein, the underlayer 20 (which, in FIG. 1, is deliberately represented not in scale with the rest of the elements in order to highlight more clearly the characteristics thereof) has a general stratified structure, in which various elements may be identified.

Said stratified structure will now be described proceeding from the top downwards with reference to the laying condition represented in FIG. 1, which is the one preferred for outdoor applications. It must, on the other hand, be taken into account that, in some conditions of use (for example, in an indoor context and/or in the presence of rather thin and compliant floorings) the condition of laying of the underlayer 20 could be exactly turned over through 180° with respect to the position illustrated in FIG. 1.

The first layer that is encountered in the structure is formed by a layer of non-woven fabric (NW) 21. It is typically a material of the type commonly referred to as "continuous-yarn non-woven geo-textile fabric", usually obtained with a process of the needled-felt type. The material in question has, for example, a weight (mass per unit area according to the standard UNI EN ISO 965) of 200-400 g/m$^2$, typically 300 g/m$^2$, and is preferably made of polyester.

The layer 21 is coupled to a polyolefin layer 22 (e.g., low-density polyethylene—LDPE) of the weight of 60-120 g/m$^2$, typically 90 g/m$^2$. This composite layer is subjected to thermoforming to obtain pouches of a parallelepipedal shape having a square base with a side of 20-60 mm, typically 45 mm, and a height ranging between 20 and 40 mm, typically 30 mm.

The pouches thus pre-thermoformed are filled, for example in an amount of 5-20 kg/m$^2$, with granular elastic material 23, such as, for example, granules of recycled tyres. The granular elastic material 23 preferably has a size of between 0.5 and 7.0 mm. The filling capacity tends of course to vary as the size of the pouches varies; the currently preferred value of filling, within the range indicated above of 5 to 20 kg/m$^2$, is approximately 12 kg/m$^2$.

Proceeding downwards, this is followed by a composite layer 24, 25 substantially identical to the set of layers 21 and 22 described previously. It is hence a polyolefin layer 24 (made, for instance, of low-density polyethylene—LDPE) with a weight of 60-120 g/m$^2$, typically 90 g/m$^2$, thermobonded to a layer of a material of the type commonly referred to as "continuous-yarn non-woven geo-textile fabric", usually obtained with a process of the needled-felt type. The material of the layer 25 has, for example, a weight (mass per unit area according to the standard UNI EN ISO 965) of 200-400 g/m$^2$, typically 300 g/m$^2$, and is preferably made of polyester.

The two polyolefin layers 22 and 24 are heat-sealed to one another and cap the pouches containing the granular material 23 so encapsulating said material, rendering each individual pouch and its contents impermeable.

This prevents any type of contact and/or transfer/release outwards of material or components, rendering the pouches impermeable to water and humidity in general and guaranteeing a good compressive behaviour even at low temperatures. As a result it is possible to use ground recycled material of various origin, such as tyres and/or gaskets. Said recycled material, encapsulated as described above, cannot release into the environment any of the substances that it contains, such as, for example, aromatic amines and/or products known as PAH (defined by the standard ISO 13877) and hence will not be able to have any adverse ecological impact.

Figure 2:
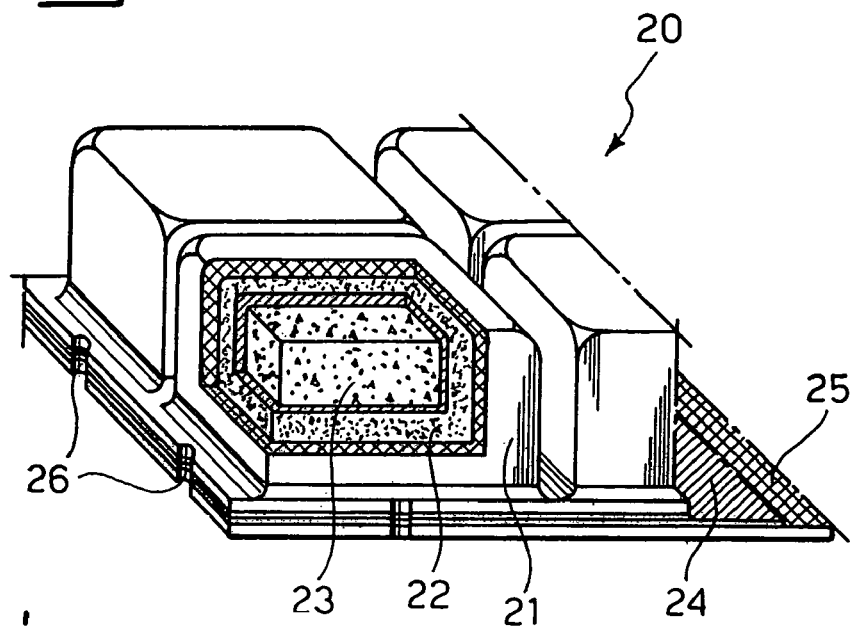
FIG. 2 is a partially cutaway perspective view of a portion of underlayer of the type described herein.

The composition of the structure of the underlayer 20 just described may be appreciated even more from the perspective view of FIG. 2, where the underlayer 20 is illustrated on its own, without the flooring 1 laid on top of it.

Once again, it should be recalled that, even though the underlayer 20 is represented herein with reference to a condition of laying in which the pouches containing the granular material 23 practically "protrude" upwards with respect to a plane of core identified by the layers 24 and 25, the condition of laying could be exactly opposite, i.e., with the pouches containing the granular material 23 that project downwards with respect to the aforesaid plane of core identified by the layers 24 and 25.

A possible sequence of production of the underlayer 20 just described envisages starting from the layer 21 (e.g., geo-textile material, normally available on the market) that is thermobonded (FIG. 1) to the layer 22, using methods that are well known in the art and that consequently do not require any description herein.

The first laminar structure constituted by the composite material thus obtained is subjected to thermoforming to obtain the pouches described previously and designated by 22a in FIG. 5.

After turning the material over (in the case where thermoforming has not already been performed as illustrated in FIG. 5, to form the pouches 22a in such a way that said pouches are open upwards), the pouches 22a are filled with the granular material 23 (FIG. 6).

The second laminar structure, constituted by the composite layer 24, 25—formed (FIG. 7) according to modalities basically identical to the ones adopted for forming the composite layer 21, 22,—is finally heat-sealed (FIG. 8) using heat-sealing tools T of a known type on the ensemble of parts already assembled, encapsulating and rendering each individual pouch and its contents impermeable.

The result thus obtained is an elastic underlayer for floorings 1 comprising a first laminar structure 21, 22 and a second laminar structure 24, 25, which enclose between them the pouches 22a that contain a filling of granular elastic material 23.

Figure 3:
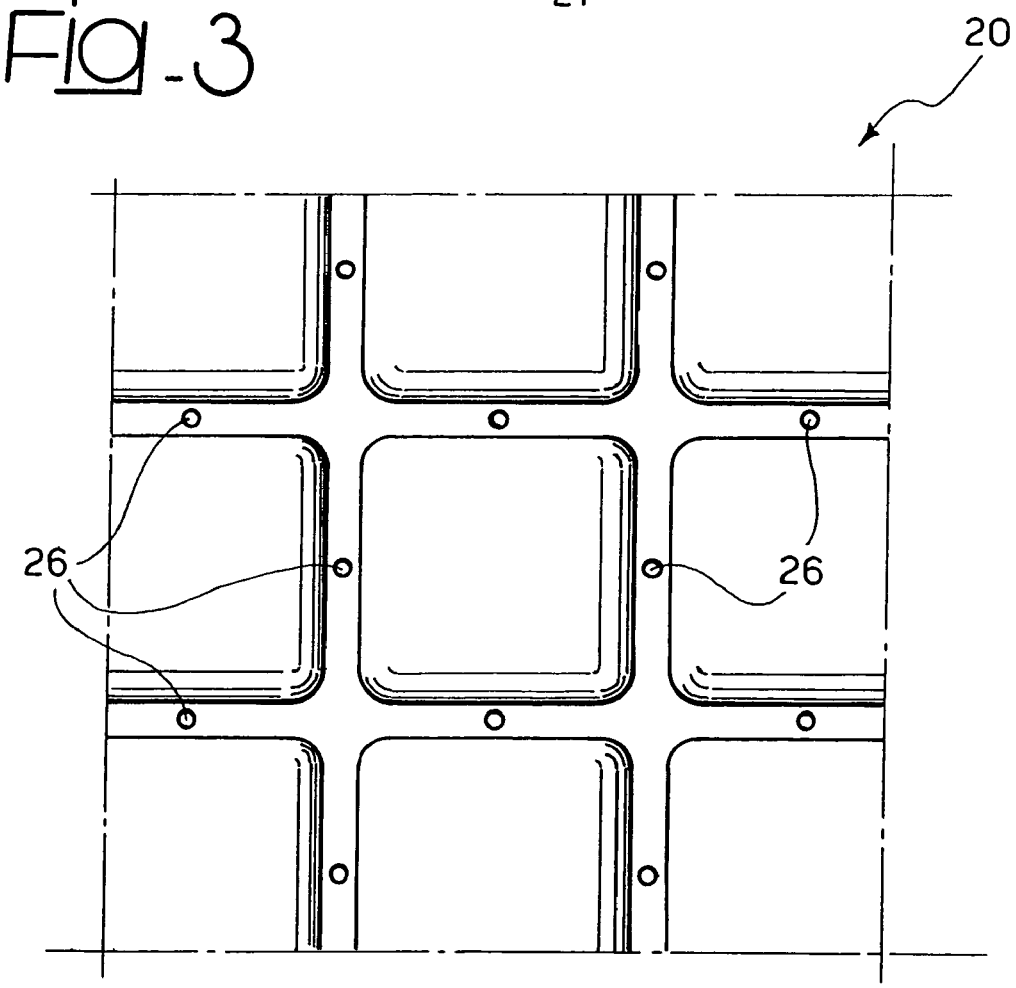
FIG. 3 is a plan view of a portion of said underlayer.

Should the application envisaged so require, the final processing operation can envisage providing draining holes 26 of a diameter of 3-4 mm, located, for example, at the sides and/or at the corners of the pouches, as may be appreciated more fully from the plan view of FIG. 3. In other applications (for example, in indoor environments), it may instead be appreciated that the sealing of the layers 21, 22, 24 and 25 will give rise to a continuous structure having the function of barrier in regard to water vapour.

The laminar product thus obtained can assume the form of plates/panels or sheets/rolls. The typical plate/panel format will have dimensions of 120×105 cm, with a surface area of 1.26 m² used with dimensions of the pouch having a square base with sides greater than 30 mm and a height greater than 30 mm. The sheet/roll format will be used for producing material with dimensions of the pouch having a square base with sides smaller than 30 mm and a height smaller than 30 mm.

In its final use, the material described above is applied directly on a draining underlayer of the so-called "dynamic" or "stabilized" type, thus avoiding the need to lay an asphalt base. The dynamic solution is obtained substantially with a compacted and rolled filling layer, obtained using calcareous material with medium/large size and high capacity for drainage and resistance to loads, on which a surface is formed of ⅘ cm of volcanic material and sand, distributed and rolled until a base is obtained that is ready and suitable for laying of a synthetic covering.

The material described herein is laid on a base obtained as described above. It is likewise possible to distribute a layer of sand, for example of a depth of 5 to 10 mm, on the surface of the underlayer 20 prior to laying of the flooring. In FIG. 1, said addition of sand is designated by S; it will be appreciated that, in the conditions of laying illustrated (pouches facing upwards), the sand S is distributed mainly in the grooves between adjacent pouches.

The distribution of sand (or other granular material) on the underlayer 20 can be used for selectively varying the biomechanical characteristics of the ensemble made up of the underlayer 20 and the flooring/covering laid on top of it.

The underlayer described enables a final product to be obtained that is in compliance with FIFA standards (Handbook, edition of Feb. 28, 2005) especially as regards absorption of energy (requisite>60%) in combination with a vertical deformation not greater than 8 mm. The variation in the size and shape of each pouch, and hence the variation in its capacity for absorption/return of energy, are to be understood as being a function of the requirements of the particular sports activity.

The underlayer described herein presents excellent qualities of resistance to compression, deformation and absorption of energy, quality control at the origin, good behaviour in conditions of heat and cold, good drainage, low installation costs, long duration, guarantee of long-term performance, excellent dimensional stability, natural playing characteristics, and low environmental impact.

Of course, without prejudice to the principle of the invention, the details of construction and the embodiments may vary widely with respect to what is described and illustrated herein purely by way of non-limiting example, without thereby departing from the scope of the invention, as defined in the annexed claims. This applies, in particular, as regards the possibility of using the underlayer described herein together with floorings other than floorings for sports activities such as, for example, synthetic-grass coverings.

The invention claimed is:
1. A synthetic grass structure comprising:
   a first laminar structure and a second laminar structure that encapsulate between them pouches, said pouches completely filled with granular elastic material;
   said first laminar structure and second laminar structure each comprising a layer of non-woven fabric coupled to a polyolefin layer, the polyolefin layers of said first laminar structure and second laminar structure encapsulating between them said pouches, the polyolefin layers being sealed together.
2. The structure according to claim 1, wherein said layer of non-woven fabric comprises continuous-yarn needled geotextile fabric.
3. The structure according to claim 1, wherein said layer of non-woven fabric has a weight of 200-400 g/m².
4. The structure according to claim 3, wherein said layer of non-woven fabric has a weight of 300 g/m².
5. The structure according to claim 1, wherein said layer of non-woven fabric is polyester based.
6. The structure according to claim 1, wherein said polyolefin layer has a weight of 60-120 g/m².
7. The structure according to claim 6, wherein said polyolefin layer has a weight of 90 g/m².
8. The structure according to claim 1, wherein said polyolefin layer has a base of low-density polyethylene (LDPE).
9. The structure according to claim 1, wherein said pouches have a parallelepiped shape.
10. The structure according to claim 1, wherein said pouches have a square base.
11. The structure according to claim 1 wherein said pouches have sides of 20-60 mm.
12. The structure according to claim 1, wherein said pouches have a height of between 20 and 40 mm.
13. The structure according to claim 1, wherein said pouches are filled with granular elastic material in an amount of 5-20 kg/m².
14. The structure according to claim 13, wherein said pouches are tilled with granular elastic material in an amount of about 12 kg/m².
15. The structure according to claim 1, wherein said granular elastic material consists of granules of recycled tires.
16. The structure according to claim 1, wherein said granular elastic material has a size of between 0.5 and 7.0 mm.
17. The structure according to claim 1, wherein said first laminar structure and said second laminar structure encapsulate said pouches which contain said granular material, rendering each individual pouch and its contents impermeable.
18. The structure according to claim 1 further comprising, draining holes set in lateral positions and/or at the corners of said pouches.
19. The structure according to claim 1 in the form of at least one of plates and panels.
20. The structure according to claim 19, wherein said at least one of plates and panels have dimensions in the region of 120×105 cm.
21. The structure according to claim 19, wherein said pouches have a square base with a side larger than 30 mm and a height larger than 30 mm.
22. The structure according to claim 1, in the form of at least one of sheets and rolls.
23. The structure according to claim 22, wherein said pouches have a square base with a side smaller than 30 mm and a height smaller than 30 mm.
24. A flooring system comprising the structure according to claim 1 and a flooring laid on top of the pouches.
25. The system according to claim 24, wherein said flooring is a flooring for sports facilities.
26. The system according to claim 24, wherein said flooring for sports facilities is a synthetic-grass covering.

27. A process for manufacturing an underlayer, the process comprising:
   providing a first laminar structure and a second laminar structure that enclose between them pouches, the pouches completely filled with granular elastic material; and
   the first laminar structure and second laminar structure each comprising a layer of non-woven fabric coupled to a polyolefin layer, the polyolefin layers of the first laminar structure and second laminar structure encapsulating between them the pouches, the polyolefin layers being sealed together.

28. The process according to claim 27, further comprising the operation of obtaining said pouches from said first laminar structure via thermoforming.

29. The process according to claim 27 further comprising:
   filling said pouches with said granular material; and
   applying said second laminar structure on said pouches filled with said granular material so as to encapsulate said pouches.

30. The process according to claim 27, further comprising the operation of heat-sealing said second laminar structure on said pouches filled with said granular material position.

* * * * *

UNITED STATES PATENT AND TRADEMARK OFFICE
CERTIFICATE OF CORRECTION

PATENT NO.        : 8,221,856 B2                                Page 1 of 1
APPLICATION NO.   : 11/439005
DATED             : July 17, 2012
INVENTOR(S)       : Fernando Stroppiana It is certified that error appears in the above-identified patent and that said Letters Patent is hereby corrected as shown below:

Column 8 Line 9: Claim 30, Delete "claim 27" and insert -- claim 29 --

Signed and Sealed this
Eleventh Day of September, 2012

David J. Kappos
*Director of the United States Patent and Trademark Office*